United States Patent
Malvern et al.

(10) Patent No.: US 11,041,724 B2
(45) Date of Patent: Jun. 22, 2021

(54) NAVIGATION SYSTEM

(71) Applicant: Atlantic Inertial Systems, Limited, Plymouth (GB)

(72) Inventors: Alan Malvern, Plymouth (GB); Nicholas R. Wilkinson, Plympton (GB)

(73) Assignee: ATLANTIC INERTIAL SYSTEMS LIMITED, Plymouth (GB)

( * ) Notice: Subject to any disclaimer, the term of this patent is extended or adjusted under 35 U.S.C. 154(b) by 188 days.

(21) Appl. No.: 15/784,255

(22) Filed: Oct. 16, 2017

(65) Prior Publication Data

US 2018/0128616 A1 May 10, 2018

(30) Foreign Application Priority Data

Nov. 9, 2016 (GB) ..................... 1618940

(51) Int. Cl.
*G01C 21/00* (2006.01)
*G01C 21/16* (2006.01)
*G01C 21/04* (2006.01)

(52) U.S. Cl.
CPC ........... *G01C 21/005* (2013.01); *G01C 21/04* (2013.01); *G01C 21/165* (2013.01)

(58) Field of Classification Search
CPC ..... G01C 21/005; G01C 21/04; G01C 21/165
USPC .......................................................... 701/448
See application file for complete search history.

(56) References Cited

U.S. PATENT DOCUMENTS

| 5,272,639 A | 12/1993 | McGuffin |
| 5,345,241 A | 9/1994 | Huddle |
| 5,402,340 A | 3/1995 | White et al. |
| 5,912,643 A | 6/1999 | Chew et al. |
| 8,594,927 B2 | 11/2013 | Louis et al. |
| 2012/0203455 A1* | 8/2012 | Louis ................... G01C 21/005 701/505 |

FOREIGN PATENT DOCUMENTS

RU 2161296 C1 12/2000

OTHER PUBLICATIONS

Intellectual Property Search Report for International Application No. 1618940.9 dated Apr. 5, 2017, 3 pages.
European Search Report for Application No. 17197991.7-1003 dated Mar. 12, 2018, 12 pages.

* cited by examiner

*Primary Examiner* — Khoi H Tran
*Assistant Examiner* — Rodney P King
(74) *Attorney, Agent, or Firm* — Cantor Colburn LLP

(57) ABSTRACT

A navigation system comprising: an inertial navigation system arranged to output a first position estimate; a terrain based navigation unit arranged to output a second position estimate; a gravity based navigation unit arranged to output a third position estimate; a stored gravity map arranged to receive a position and to output gravity information for that position; and an iterative algorithm unit arranged to determine an INS error state in each iteration; wherein in each iteration the iterative algorithm unit is arranged to: receive the first position estimate, the second position estimate, and the third position estimate; determine a gravity corrected position estimate based on the first position estimate, the INS error state and the gravity information; and update the INS error state for the next iteration based on the INS error state, the gravity corrected position estimate, the second position estimate and the third position estimate.

13 Claims, 1 Drawing Sheet

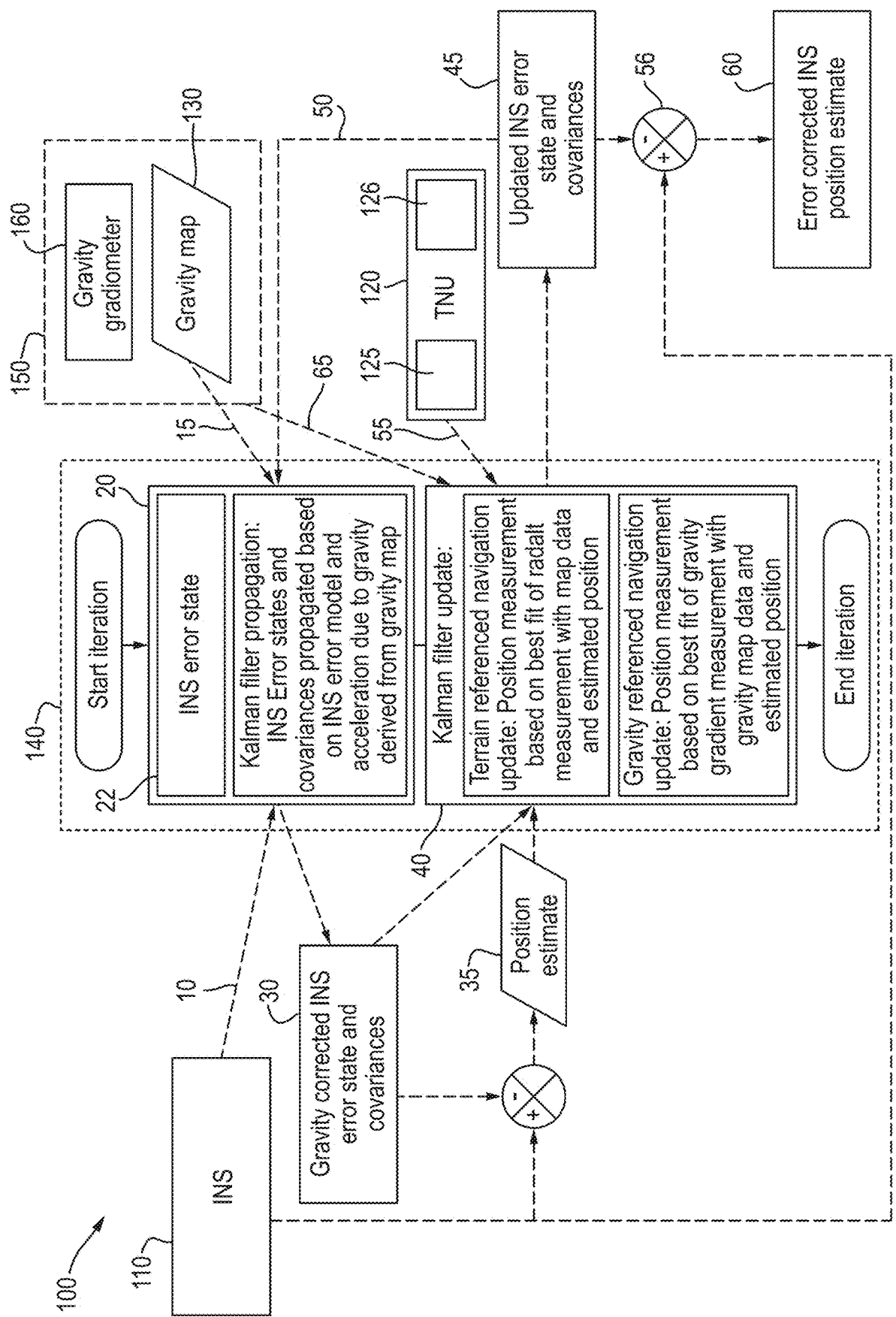

NAVIGATION SYSTEM

FOREIGN PRIORITY

This application claims priority to Great Britain Patent Application No. 1618940.9 filed Nov. 9, 2016, the entire contents of which is incorporated herein by reference.

TECHNICAL FIELD

The present disclosure relates to a navigation system, a vehicle comprising the navigation system, a method, a computer-readable medium, and an apparatus for reducing the amount of uncertainty in an inertial navigation system, particularly in the presence of a gravitational anomaly.

BACKGROUND

Terrain Referenced Navigation (TRN) systems which integrate aircraft navigation data, radar altimeter data and digital terrain elevation data to generate a navigation solution are in service on a number of airborne platforms and provide a navigation solution and an uncertainty estimate for the navigation solution. Such systems often use the navigation solution from an Inertial Navigation System (INS) as a key input and use INS error calibrating Kalman Filters as a means of integrating the terrain based position measurements with the INS data.

Terrain referenced navigation (TRN) systems are often used by vehicles (e.g. airplanes, ships, submarines, and cars) for navigating along a desired route.

Conventional TRN systems integrate aircraft navigation data, radar altimeter data and digital terrain elevation data to determine the vehicle's navigation data (e.g. position, velocity and acceleration of the vehicle). The navigation data may for example be used to check whether the vehicle is navigating along a desired route and to determine suitable course corrections when off-route. An estimate of the uncertainty in the data will often also be monitored. Such systems often use the location data from an Inertial Navigation System (INS), i.e. one which uses the outputs from inertial sensors such as accelerometers and gyroscopes to determine the vehicle's velocity and location information. Small errors in the measuring capabilities of the accelerometers or in the balance of the gyroscopes can over time lead to build up of large errors in the outputs of the INS. Such errors can lead to significant errors in estimates of vehicle location and can be problematic for location-based decisions, for example resulting in false course corrections. Typically, the errors in the INS position estimates drift at a rate of around 2 nautical miles per hour due to the integration over time of errors within the accelerometer and gyroscope sensors within the INS.

To improve the estimate of the error and location, some TRN systems bind the INS errors by integrating the INS location measurement with terrain aided navigation (TAN) measurements in a Kalman filter. In addition to this TAN based Kalman filter measurement, some systems, such as the system in U.S. Pat. No. 5,272,639, provide a second estimate of the error and location by binding the INS errors using gravity field data in a second Kalman filter. With this approach, a selection can then be made to navigate the vehicle using either the TAN based Kalman filter results or the gravity field based Kalman filter results, depending on which Kalman filter has the smallest error. This approach is said to be advantageous in U.S. Pat. No. 5,272,639 because when travelling over flat terrain the TAN based Kalman filter results will have comparatively large errors, and by having a selection feature, these results can be disregarded in favour of the gravity field based Kalman filter results.

One of the key benefits that a TRN system offers is the capability to provide a high performance navigation solution in GPS denied conditions (e.g. when GPS is unavailable such as when it is being jammed or when it cannot be trusted such as when there is a suspicion that it may be spoofed). However the system does have a number of limitations:

1) For a TRN system to calculate a navigation solution the aircraft (or other vehicle) needs to be travelling over or within terrain with some feature to it and within the operational range of the radar altimeter (or other terrain profile sensor) to allow TRN to locate the nearby terrain with the map data. Over flat terrain, water or without radar altimeter information a TRN system will generally not be able to maintain an accurate navigation solution.

2) The input from the Inertial Navigation System's navigation solution can be severely degraded by travel over or within an area where gravity anomalies occur. Typically systems in service today have no knowledge of where such gravity anomalies occur. The accelerometers within the INS sense an acceleration due to the gravity anomaly and erroneously attribute it to vehicle motion and integrate the acceleration into the INS navigation solution leading to erroneous position, velocity, acceleration and attitude outputs. This in turn severely degrades the navigation solution output of the Terrain Referenced Navigation system and can also make the uncertainty output unrepresentative of the likely error in the solution, potentially making the navigation solution and uncertainty unsafe to use.

Many vehicles employ Kalman Filter type algorithms within their navigation systems to calibrate the errors within the INS using navigation data from other sources such as GPS, Terrain Referenced Navigation, etc. together with an INS error model that understands the relationship between the inertial sensor errors and the navigation errors produced by the INS. Such INS error estimating algorithms may typically then make a set of corrections available to other systems that use the INS navigation solution.

The present disclosure seeks to provide an improved TRN that further improves the accuracy of the estimated error and location of an INS.

SUMMARY

According to a first aspect, this disclosure provides a navigation system comprising: an inertial navigation system arranged to output a first position estimate; a terrain based navigation unit arranged to output a second position estimate; a gravity based navigation unit arranged to output a third position estimate; a stored gravity map arranged to receive a position and to output gravity information for that position; and an iterative algorithm unit arranged to determine an INS error state in each iteration;

wherein in each iteration the iterative algorithm unit is arranged to: receive the first position estimate, the second position estimate, and the third position estimate; determine a gravity corrected position estimate based on the first position estimate, the INS error state and the gravity information; and update the INS error state for the next iteration based on the INS error state, the gravity corrected position estimate, the second position estimate and the third position estimate.

The INS error state represents the estimated error in the position estimate from the inertial navigation system (INS). The navigation system may combine the INS position estimate with the INS error state to provide an error corrected position estimate. That is, the navigation system may use the INS error state as a correction function (which may include a plurality of correction values) for correcting the position estimate from the INS.

The INS error state may also comprise data representative of the error in the INS sensor measurements (e.g. accelerometer and gyroscope measurements), attitude errors, and velocity error. Accordingly, it will be appreciated that the INS error state may be used to correct the overall navigation solution provided by the INS.

The gravity information obtained from the gravity map can be used to determine the components of the INS's accelerometer and gyroscope outputs that are due to the local gravity field, and in particular can take account of the spatial variations in the local gravity field. The remaining components of the sensor outputs are assumed to be due to vehicle movement. Therefore by taking into account the local gravity field information, together with the INS error state of the current iteration and the first position estimate from the INS, the navigation system can correct the first position estimate to provide a gravity corrected position estimate.

The accuracy of the INS error state estimate in each iteration is improved by updating the INS error state for the next iteration based on the INS error state of the current iteration, the gravity corrected position estimate, the second position estimate, and the third position estimate. In particular, it is found that the accuracy of the INS error state is especially improved by taking the second position estimate and the third position estimate into account when updating the INS error state based on the gravity corrected position. This is because the second and the third position estimates constrain the growth in the error of the gravity corrected INS output.

It will be appreciated that the gravity corrections are not simply applied directly as corrections to the INS outputs, but the gravity corrected position estimate can instead be used simply as another position estimate, alongside the second position estimate and third position estimate. By monitoring the uncertainties in each estimate the iterative algorithm can weight the different position estimates according to their estimated uncertainties, placing more weight on position estimates that have lower uncertainty.

It will be appreciated that the architecture can be extended to include additional sources of navigation information such as GPS. For example, GPS could be used as an additional (e.g. fourth) position estimate alongside the gravity corrected position estimate, the second position estimate and the third position estimate.

Thus, it will be appreciated that as a result of the updating step the next iteration of the iterative algorithm unit is arranged to inherit an INS error state based on the parameters and calculations of the preceding iteration. In particular, it will be appreciated that the next iteration of the iterative algorithm unit will use an INS error state based on the INS error state of the current iteration, the gravity corrected position estimate, the second position estimate, and the third position estimate.

It will also be appreciated that by basing the updating step on the INS error state of the current iteration, the gravity corrected position estimate, the second position estimate and the third position estimate, the system is able to improve the accuracy of the INS error state when travelling over flat terrain such as a body of water, or when the TNU sensors (such as radar altimeter) need to be switched off, e.g. for covert operations. This is because, compared to the TNU, the GNU operates covertly (i.e. it measures the gravity profile information without emitting signals) and may provide a more accurate position estimate for the updating step when travelling over flat terrain. In some examples, more weight is placed on the GNU position estimate in the updating step when the accuracy associated with the TNU position estimate is low such as when travelling over flat terrain. The accuracies associated with the TNU position estimate and/or GNU position estimate may be, for example, based on the strength of their respective correlation results.

In examples, the iterative algorithm unit comprises a Kalman filter or other type of "predictor corrector" algorithm. The Kalman filter may be a modified Kalman filter such as an extended Kalman filter. The Kalman filter includes an error model that models and propagates the INS error state. The Kalman filter preferably models the relationship between the inertial sensors and the navigation errors produced by the INS. In each iteration, the Kalman filter preferably updates the propagated error state based on the INS error state, the gravity corrected position estimate and the second position estimate. As the iterative algorithm unit may predict the growth in the INS error state from one iteration to the next iteration, the contribution from gravity is monitored and taken into account. It will be appreciated that Kalman filters are a type of "predictor corrector" iterative algorithm that uses least squares estimation within the correction or measurement step (i.e. update step). As with a Kalman filter, such least squares estimators provide an estimate of a subsequent state based on prior states. Thus, it will be appreciated that in some examples the iterative algorithm unit may comprise a least squares estimator (i.e. predictor corrector iterative algorithm).

The terrain based navigation unit (TNU) may be arranged to determine the second position estimate based on a correlation between measured terrain profile data and stored terrain profile data in a terrain map (e.g. digital terrain elevation data). The measured terrain profile data may be obtained using any suitable sensor or detection equipment. However, in some preferred examples, a radar altimeter or laser altimeter is used. The terrain profile data may comprise surface topology measurements such as surface height measurements. In traditional TRN systems the INS output is used to provide a coarse position estimate. The TRN algorithms then generate a correction to the INS position based on the matching of the radar (or laser) altimeter data with the terrain elevation data.

The gravity based navigation unit (GNU) may be arranged to determine the third position estimate based on a correlation between measured gravity profile information and the stored gravity profile information in the gravity map. The gravity profile information may be measured using any suitable sensor or detection equipment. However, in some preferred examples, a gravity gradient sensor such as a gravity gradiometer which may, for example, be a Lockheed Martin gravity gradiometer or a cold-atom based gravity gradiometer, or other such gravity profiling sensor is used.

The second and the third position estimates provide an external and independent measurement of position. In examples where the iterative algorithm unit comprises a Kalman filter or other type of "predictor estimator" algorithm, the second and third position estimates bind the growth in the error of the INS output by integrating the gravity corrected position estimate with the second and the third position estimates.

In some examples, in each iteration, the iterative algorithm unit may be arranged to weight the second and third position estimates, optionally depending on an estimated accuracy associated with the second position estimate and/or third position estimate. That is, for example, the constraints provided by the second and the third position estimates in the updating step may be applied in different proportions using known weighting techniques based on, for example, the estimated accuracy associated with the second and third position estimates (e.g. the estimated accuracy in the correlation result, measured terrain data and/or measured gravity information). The weighting may be achieved by applying a gain function to the second position estimate, for example, based on the estimated accuracy of the correlation result associated with the second position estimate. Similarly, a separate gain function may be applied to the third position estimate, for example, based on the estimated accuracy of the correlation result associated with the third position estimate. The estimated accuracy of the correlation result associated with the second/third position estimate may be based on the respective correlation strength. In examples where the iterative algorithm unit comprises a Kalman filter or other type of "predictor corrector" algorithm, the weighting may be achieved by applying and adjusting the gain functions of the Kalman filter to each of the second and the third position estimates, optionally depending on the estimated accuracy of the second and the third position estimates, respectively.

It will be appreciated that the gravity and terrain map may take any of a number of forms. For example, the gravity/terrain map may be locally stored in a data storage medium (e.g. in a hard drive) or stored remotely (e.g. in a cloud based system).

In some preferred examples, the gravity information may comprise three-dimensional gravity field strength/gradient data, and/or a second or a third order tensor of the gravity field strength/gradient. It is advantageous to use gravity gradient data as it is computationally easier to determine the effect of a gravity anomaly on the INS sensor measurements. For example, the gravity gradient can be fed directly into non-linear equations of motion to determine the components of accelerometer and gyroscope output that are due to the gravity gradient. The computational process is made even quicker using tensors. Further, it is advantageous to use tensors as it is computationally easier to correlate the measured gravity information with the stored gravity information. Such increases in speed are of course desirable for "real-time" navigation, particularly when travelling at high speeds of greater than 200 miles per hour. 3D gravity information enables the effects of a gravity anomaly on the INS sensor to be determined more accurately than 2D or 1D gravity information. Further, 3D gravity information improves the accuracy of the correlations and thereby the gravity position estimate.

The first, second, and third position estimates may comprise three dimensional coordinates.

The error, and hence accuracy, in the INS position estimates drift over time, typically at a rate of up to 2 nautical miles per hour (as errors in the inertial sensor measurements integrate into velocity and attitude errors, which in turn integrate into position errors).

TNU position estimates are typically accurate to within around 20 meters when there is sufficient information in the terrain map information and the terrain measurement information for a good correlation. However, when there is insufficient information in the terrain map data and the terrain measurements for a good correlation (e.g. when travelling over flat terrain) the error in the TNU position estimate may increase.

It will be appreciated that following a period without sufficient information in the terrain map data and the terrain measurements for a good correlation, should sufficient information then become available, the error in the TNU position estimate will typically return to within a 20 meter accuracy level once the TNU has correlated the information.

GNU position estimates may be accurate to within around 20 meters where good quality map data is available, but the accuracy will vary depending on the uniformity of the gravity information, the height of the aircraft, and the quality (e.g. resolution) of the gravity gradient map, and in some cases the accuracy may drop to around 10 kilometres.

The error in position estimate from the navigation system may also drift but it will drift at a lower rate than the 2 nautical miles per hour exhibited by the INS solution, and, in general, the position estimate from the navigation system will be more accurate than the individual INS, TNU and GNU position estimates. This is because the navigation system position estimate benefits from the correction applied by the updated INS Error State.

In examples, the position estimate received by the stored gravity map may be the first position estimate as corrected by the INS error state. In other examples it may be the first, the second or the third position estimate. In some other examples, the first position estimate may be used when the estimated accuracy in the INS is better than a predetermined threshold for the x, y and/or z position coordinates. The second/third position estimate may be used when the estimated accuracy of the second/third position estimate is better than a predetermined threshold. Selecting which position estimate to use in this way ensures that the gravity information is determined at the most accurate location estimate available. Most preferably, the position estimate received by the stored gravity map is the first position estimate as corrected by the INS error state. In normal operation this is expected to be the most accurate position estimate available. In some examples, the threshold level may be set according to the estimated accuracy of the INS, TNU or GNU (e.g. based on the estimated uncertainties discussed above).

In some examples, in each iteration of the iterative algorithm unit, the iterative algorithm unit may be further arranged to output an error corrected position estimate based on the INS error state for the next iteration and the first position estimate from the INS. The error corrected position estimate provides a position estimate that more accurately accounts for changes in the gravity field by correcting the first position estimate with the INS error state for the next iteration.

This disclosure also extends to a vehicle comprising a navigation system according to any of the above examples (optionally including any or all of the preferred or optional features described above).

According to a further aspect, this disclosure provides an iterative method of determining an INS error state, each iteration of the method comprising: receiving a first position estimate from an inertial navigation system, a second position estimate from a terrain based navigation unit, and a third position estimate from a gravity based navigation unit; determining gravity information at a received position from a stored gravity map; determining a gravity corrected position estimate based on the first position estimate, the INS error state and the gravity information; and updating the INS error state for the next iteration based on the INS error state, the gravity corrected position estimate, the second position estimate and the third position estimate.

The features described above in relation to the system, including the preferred and optional features, apply equally to the iterative method.

Accordingly, for example, the INS error state may be updated using a Kalman filter.

The second position estimate may be determined based on a correlation between measured terrain profile data and stored terrain profile data in a terrain map.

The third position estimate may be determined based on a correlation between measured gravity profile information and the stored gravity profile information in the gravity map.

The gravity information from the stored gravity map is determined based on the first position estimate as corrected by the INS error state, the first position estimate, the second position estimate, or the third position estimate.

The method may further comprise weighting the second and the third position estimate, optionally depending on an estimated accuracy associated with the second position estimate and/or third position estimate. Accordingly, the method may comprise updating the INS error state for the next iteration based on the INS error state, the gravity corrected position estimate, the weighted second position estimate and the weighted third position estimate.

Each iteration of the iterative method may further comprise outputting an error corrected position estimate based on the INS error state for the next iteration and the first position estimate.

This disclosure also extends to a computer-readable medium comprising instructions that are executable by a processor to perform any of the above-described methods.

This disclosure also extends to apparatus comprising a processor and a memory, the memory storing instructions that are executable by the processor to perform any of the above-described methods.

BRIEF DESCRIPTION OF THE DRAWINGS

One or more non-limiting examples will now be described, with reference to the accompanying drawings, in which FIG. 1 illustrates a schematic flow block diagram of a navigation system 100 in accordance with the present disclosure.

The navigation system 100 shown in FIG. 1 is for a vehicle such as an aeroplane, a car, a boat or a rocket. The navigation system 100 comprises an iterative algorithm unit (IAU) 140 in communication with an inertial navigation system (INS) 110, a terrain based navigation unit (TNU) 120, a gravity based navigation unit (GNU) 150, and a stored gravity map 130 within the GNU 150. The communication link with the stored gravity map 130 may be via the link with the GNU or via a direct link to the stored gravity map 130. It will be appreciated that existing navigation systems use an IAU 140 comprising a Kalman filter, together with an INS 110 and optionally a TNU 120 or GNU 150 to determine the error in the INS vehicle position estimate 10 and, by correcting for the determined error, provide a better vehicle position estimate 60.

In the system according to examples of this disclosure, the IAU 140 comprises processing blocks 20 and 40. Processing block 20 comprises an INS error state 22 and a Kalman filter propagation unit wherein INS error states and covariances are propagated based on INS Error Model and acceleration due to gravity derived from the gravity map 130. Processing block 40 comprises a Terrain Referenced Navigation Update unit and a Gravity Referenced Navigation Update unit. The Terrain Referenced Navigation Update unit is configured to process position measurements based on best fit of terrain sensor measurements (e.g. radar altimeter (Radalt)) with map data (e.g. terrain map data) and estimated positions (e.g. gravity corrected position estimate 35). The Gravity Referenced Navigation Update unit is configured to process position measurements based on best fit of Gravity Gradient measurement with Gravity Map data and estimated positions (e.g. gravity corrected position estimate 35).

More specifically, the IAU 140 is arranged to determine an updated INS error state 45. The updated INS error state 45 is determined based on the INS error state 22, the gravity corrected position estimate 35, the second position estimate 55, and the third position estimate 65. The result of this is that the INS error state 45 accounts for the error associated with the effect of gravitational anomalies on the INS position estimate 10, and that the growth in the error of the INS output is bound by the TNU position estimate 55 and the GNU position estimate 65. Preferably, the navigation system 100 also determines an error corrected position estimate 60. The error corrected position estimate 60 relates to the INS's position estimate 10 as corrected by the updated INS error state 45.

As the gravity corrections are applied as part of the iterative algorithm alongside the second position estimate, rather than simply being applied directly to the INS output, the uncertainty in those corrections can be monitored in the same way as the uncertainty in the second position estimate is monitored. Thus the accuracy of those corrections can be suitably taken into account when updating the error state.

The INS 110 is a standard INS that estimates the location of the vehicle using suitable sensors such as accelerometers and gyroscopes. The INS 110 may of course provide other navigation data such as the velocity, roll, pitch, and yaw of the vehicle based on the accelerometer and/or gyroscope readings.

The TNU 120 comprises a digital terrain map 125 and a terrain profiling sensor 126 such as a radar altimeter. The digital terrain map 125 comprises information on the surface topology which includes terrain elevation information above a reference surface (e.g. above a geoid or other reference surface) and possibly other such terrain profile data. Such digital terrain maps 125 may be obtained from, for example, government survey agencies. The terrain profiling sensor 126 is positioned to measure the elevation of the surface topology. An estimate of the vehicle position is determined by correlating the measured terrain profile data with the terrain profile data in the terrain map. The position on the terrain map that is associated with the highest correlation strength provides an estimate of the vehicle's position.

It will be appreciated that the TNU 120 yields inaccurate correlation results when travelling over flat land or a body of water as such terrains have fewer uniquely defined features compared to terrains with more uniquely defined features such as mountainous terrains. In such cases, the TNU 120 can yield erroneous correlations and thus inaccurate TNU position estimates 55. To address the impact of such inaccuracies in the TNU position estimates 55, the IAU 140 is configured to update the INS error state 22 based on the GNU position estimate 55, together with the current INS error state 22, the gravity corrected position estimate 35, and the TNU position estimate 55. Different weights may be applied to each position estimate according to their estimated accuracies.

The GNU 150 comprises a digital gravity map 130 and a gravity gradient sensor 160 such as a gravity gradiometer 160 which may, for example, be a Lockheed Martin gravity gradiometer or a cold-atom based gravity gradiometer, or other such gravity profiling sensor. The gravity map 130 comprises a 3D spatial map of information on the gravity gradient. Additionally or alternatively, the gravity map 130 may comprise a 3D spatial map of information on gravity field strength and direction. The gravity map 130 may be obtained from, for example, gravity mapping surveys. The gravity gradient sensor 160 is positioned to measure the gravity gradient profile. An estimate of the vehicle position is determined by correlating the measured gravity profile information with the stored gravity profile information in the gravity map. The position on the gravity map that is associated with the highest correlation strength provides an estimate of the vehicle's position.

Unlike the TNU 120, the accuracy of the GNU position estimate 65 is dependent on the make-up (e.g. geology and density) of the terrain, rather than the profile of the terrain. Accordingly, for example, when travelling over a body of water the gravity gradient sensor 160 will still be able to measure features in the gravity gradient/field strength profile as a result of the varying make-up of the terrain below the surface of the water. The features in the gravity gradient/field strength profile will thus yield better correlation results for estimating the position of the vehicle. Accordingly, when the error associated with the TNU 120 position estimate 55 is comparatively large compared to the GNU position estimate 65, the IAU 140 is configured to place more weight on the GNU position estimate 65 than the TNU position estimate 55. Thus, it will be appreciated that in the update calculations at processing block 40, the GNU position estimate 65 and the TNU position estimate 55 are weighted according to the amount of uncertainty associated with their estimates. In this way, the IAU 140 is able to determine a more accurate INS error state 45 for use in the next iteration of the IAU 140 and for determining a more accurate error-corrected INS position estimate 60.

Another benefit of using the GNU 150 measurements (i.e. sensor 160 measurements and the correlation process) is that it enables underwater terrain features which are not detectable by the terrain profiling sensor 126 (e.g. radar altimeter) to be inferred from, for example, the correlated gravity gradient/field strength profile and/or measured gravity gradient/field strength profile. The inferred terrain profile may be used by the navigation system 100 (e.g. IAU 140 or TNU 120) to clarify/enhance the terrain profile data and terrain profile correlation. For example, an increasing gravity gradient profile can be used to infer the presence of an underwater mountain or a terrain features covered by snow. Thus, the profile of such features can supplement the measured terrain profile results to enhance the terrain profile correlation. Similarly, the TNU 120 terrain profile measurements can be used to infer and hence enhance the resolution and/or accuracy of the gravity gradient profile measurements. In this way, the combination of the GNU 150 and TNU 120 can enhance the accuracy of their respective vehicle position estimate 55, 65.

The stored gravity map 130 comprises a 3D spatial map of information on the gravity gradient.

The IAU 140 comprises an INS error state calculating iterative algorithm (such as a Kalman filter which may be a modified Kalman filter such as an extended Kalman filter) arranged to determine an updated INS error state 45 based on the current INS error state 22, a gravity corrected position estimate 35, the TNU position estimate 55, and the GNU position estimate 65. It will be appreciated that the INS error state calculating iterative algorithm is processed at processing blocks 20 and 40.

In a given iteration of the navigation system 100, the INS 110, the TNU 120 and the GNU 150 each determine a current position estimate 10, 55, 65 of the vehicle. At processing block 20, the IAU 140 receives the INS, TNU, and GNU position estimates 10, 55, 65 and determines the gravitational field strength based on the 3D spatial map information 15 received from the gravity map 130 at a location corresponding to the INS position estimate 10 as corrected by the INS error state 22. However, in other examples, if the TNU 120 is estimated to have an accuracy for the x, y and/or z position coordinates better than a predetermined threshold, then the IAU 140 may determine the gravitational field strength based on the 3D spatial map information 15 in the gravity map 130 at a location corresponding to the TNU position estimate 55. In other examples, if the GNU 150 is estimated to have an accuracy for the x, y and/or z position coordinates better than a predetermined threshold, then the IAU 140 may determine the gravitational field strength based on the 3D spatial map information 15 in the gravity map 130 at a location corresponding to the GNU position estimate 65. Thus, it will be appreciated that the IAU 140 may select which position estimate 10, 55, 65 to use depending on the estimated accuracy of the various position estimates. This is beneficial as it ensures that the gravity information is determined at the most accurate location estimate available.

The IAU 140 is configured to correct the INS error state 22 based on the gravitational field strength to provide a gravity corrected INS error state 30. In addition, the IAU is also configured to correct the INS position estimate 10 based on the gravity corrected INS error state 30 to provide a gravity corrected position estimate 35. For example, the IAU 140 may correct the INS position estimate 10 by correcting the associated INS sensor data (e.g. the data from the INS's accelerometer and gyroscope) with the gravity corrected INS error state 30. In other examples, the gravity corrected position estimate 35 may be determined by another component of the navigation system 100.

At processing block 40, the INS error state 22 is updated based on the gravity corrected position estimate 35, the INS error state 22, the TNU position estimate 55, and the GNU position estimate 65. For example, the gravity corrected position estimate 35 is used with the INS error state 22, the TNU position estimate 55, and the GNU position estimate 65 in a Kalman filter to provide an updated INS error state 45. It will be appreciated that the TNU and GNU position estimates act as secondary navigation aids that constrain the growth in the error of the INS output in, for example, a Kalman filter. It will also be appreciated that the updated INS error state 45 is fed forward 50 for use in the next iteration of the IAU 140. However, on the whole, it will be appreciated that updating the INS error state 45 for the next iteration based on the INS error state 22 of the current iteration, the gravity corrected position estimate 35, the TNU position estimate 55 and the GNU position estimate 65 improves the accuracy of the updated INS error state 22.

It will also be appreciated that, as a result of feeding forward the updated INS error state 45, the IAU 140 predicts and propagates the growth in the INS error state in each iteration based on the updated INS error state. In this way, the IAU 140 considers the effect of gravity in the growth of the INS error state.

At step 56, the IAU 140 is configured to correct the INS position estimate 10 based on the updated INS error state 45 to provide an error corrected position estimate 60.

Additionally or alternatively, the IAU 140 may also update covariances associated with the INS error state 22 based on the INS error state 22 of the current iteration, the gravity corrected position estimate 35, the TNU position estimate 55, and the GNU position estimate 55.

In some examples, the IAU 140 may receive the digital terrain map 125 information and the terrain profiling sensor 126 measurements from the TNU 120 and perform a correlation to determine the TNU position estimate 55 at, for example, processing block 40. Additionally or alternatively, the IAU 140 may also receive the gravity map information and the gravity sensor 160 measurements from the GNU 150 and perform a correlation to determine the TNU position estimate 55 at, for example, processing block 40.

It will thus be appreciated that with the above examples, a gravity map, a set of gravity gradiometer sensors and a Gravity Field Referenced Navigation Algorithm can be integrated into the Terrain Referenced Navigation system. Information from the gravity map at the vehicle's location will be used by the Terrain Referenced Navigation system's Kalman Filter's error Propagation as follows:

(1) The error growth in the Inertial Navigation System's navigation solution due to the effect of gravity anomalies will be estimated. The three dimensional acceleration sensed due to the local gravity anomaly at the vehicle location will be calculated from the gravity map. This additional acceleration will be accounted for by the INS error model embodied within the Kalman Filter and used to update the Kalman Filter error states.

(2) Additional uncertainty may be added to the Kalman Filter via the Process Noise matrix, proportional to the magnitude of the local gravity anomaly as read from the gravity map, to account for any errors or limitations in the acceleration estimates derived in (1) above.

(3) Measurements from the gravity gradiometer will be provided to the Gravity Field Referenced Navigation Algorithm which will search for the best fit of the measurement with the gravity map data. Where a fit is found it can be used to identify a position correction to be supplied to the Navigation Data Integrator (e.g. Kalman Filter).

As discussed above, Terrain Referenced Navigation systems are reliant on being able to observe features in the surrounding terrain. If the vehicle is in a region of flat terrain or water the Terrain Referenced Navigation solution will degrade and eventually be lost. The examples of this disclosure provide a navigation system that has all of the same benefits as TRN but also with the potential to maintain a high quality navigation solution during flight over flat terrain or water by virtue of the Gravity Field Referenced Navigation system.

Examples of this disclosure thus provide an accurate, self-contained, covert navigation system. The system does not need to have any reliance on external data sources that can be denied or spoofed (e.g. GPS). The system is also capable of having no reliance on external emissions (e.g. radar) as the TRN system can be switched off (this essentially equates to a TRN system with an infinitely large uncertainty which is thus not taken into account in the rest of the processing). When and where other navigation inputs are available and it is desirable for them to be used they can be accommodated within the system architecture.

In addition the system will also provide a robust navigation solution in areas of the world where gravity anomalies can have significant adverse effects on the performance of Inertial Navigation Systems.

The INS error state represents the estimated error in the position estimate from the inertial navigation system (INS). The navigation system may combine the INS position estimate with the INS error state to provide an error corrected position estimate. That is, the navigation system may use the INS error state as a correction for correcting the position estimate from the INS. The INS error state may also comprise data representative of the error in the INS sensor measurements, attitude errors, and velocity error. Accordingly, the INS error state may be used to correct the overall navigation solution provided by the INS.

The various methods described herein may be implemented by one or more computer program products or computer readable media provided on one or more devices. The computer program product or computer readable media may include computer code arranged to instruct a computer or a plurality of computers to perform the functions of one or more of the various methods described herein. The computer program and/or the code for performing such methods may be provided to an apparatus, such as a computer, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD. An apparatus such as a computer may be configured in accordance with such code to perform one or more processes in accordance with the various methods discussed herein. Such an apparatus may take the form of a data processing system. Such a data processing system may be a distributed system. For example, such a data processing system may be distributed across a network. Some of the processes may be performed by software on a user device, while other processes may be performed by software on a server, or a combination thereof.

The invention claimed is:

1. A navigation system comprising:
an inertial navigation system arranged to output an inertial navigation position estimate comprising three dimensional coordinates;
a terrain based navigation unit arranged to output a terrain based position estimate comprising three dimensional coordinates;
a gravity based navigation unit arranged to output a gravity based position estimate comprising three dimensional coordinates;
a stored gravity map arranged to receive a position and to output gravity information for that position;
wherein the gravity based navigation unit is arranged to determine the gravity based position estimate based on a correlation between measured gravity profile information and stored gravity profile information in the gravity map; and
an iterative algorithm unit arranged to determine an INS error state in each iteration;
wherein in each iteration the iterative algorithm unit is arranged to:
receive the inertial navigation position estimate, the terrain based position estimate, and the gravity based position estimate;
determine a gravity corrected position estimate based on the inertial navigation position estimate, the inertial navigation system error state and the gravity information; and
update the inertial navigation system error state for the next iteration based on the inertial navigation system error state, the gravity corrected position estimate, the terrain based position estimate and the gravity based position estimate.

2. A navigation system according to claim 1, wherein the iterative algorithm comprises a Kalman filter.

3. A navigation system according to claim 1, wherein the terrain based navigation unit is arranged to determine the terrain based position estimate based on a correlation between measured terrain profile data and stored terrain profile data in a terrain map.

4. A navigation system according to claim 1, wherein the gravity information comprises three-dimensional gravity field strength/gradient data, and/or a second or a third order tensor of the gravity field strength/gradient.

5. A navigation system according to claim 1, wherein the position estimate received by the stored gravity map is the inertial navigation position estimate as corrected by the inertial navigation system error state, the inertial navigation position estimate, the terrain based position estimate, or the gravity based position estimate.

6. A navigation system according to claim 1, wherein in each iteration the iterative algorithm unit is arranged to weight the terrain based and gravity based position estimates, optionally depending on an error associated with the terrain based position estimate and/or gravity based position estimate.

7. A navigation system according to claim 1, wherein in each iteration the iterative algorithm unit is further arranged to output an error corrected position estimate based on the inertial navigation system error state for the next iteration and the inertial navigation position estimate.

8. A vehicle comprising:
 a body; and
 a navigation system comprising:
  an inertial navigation system arranged to output an inertial navigation position estimate comprising three dimensional coordinates;
  a terrain based navigation unit arranged to output a terrain based position estimate comprising three dimensional coordinates;
  a gravity based navigation unit arranged to output a gravity based position estimate comprising three dimensional coordinates;
  a stored gravity map arranged to receive a position and to output gravity information for that position;
  wherein the gravity based navigation unit is arranged to determine the gravity based position estimate based on a correlation between measured gravity profile information and stored gravity profile information in the gravity map; and
  an iterative algorithm unit arranged to determine an INS error state in each iteration;
  wherein in each iteration the iterative algorithm unit is arranged to:
   receive the inertial navigation position estimate, the terrain based position estimate, and the gravity based position estimate;
   determine a gravity corrected position estimate based on the inertial navigation position estimate, the inertial navigation system error state and the gravity information; and
   update the inertial navigation system error state for the next iteration based on the inertial navigation system error state, the gravity corrected position estimate, the terrain based position estimate and the gravity based position estimate.

9. An iterative method of determining an inertial navigation system error state, each iteration of the method comprising:
 receiving an inertial navigation position estimate comprising three dimensional coordinates from an inertial navigation system, a terrain based position estimate comprising three dimensional coordinates from a terrain based navigation unit, and a gravity based position estimate comprising three dimensional coordinates from a gravity based navigation unit based on a correlation between measured gravity profile information and stored gravity profile information in a gravity map;
 determining gravity information at a received position from a stored gravity map;
 determining a gravity corrected position estimate based on the inertial navigation position estimate, the inertial navigation system error state and the gravity information; and
 updating the inertial navigation system error state for the next iteration based on the inertial navigation system error state, the gravity corrected position estimate, the terrain based position estimate and the gravity based position estimate.

10. An iterative method according to claim 9, wherein the INS error state is updated using a Kalman filter.

11. An iterative method according to claim 9, wherein the gravity information from the stored gravity map is determined based on the inertial navigation position estimate as corrected by the inertial navigation system error state, the inertial navigation position estimate, the terrain based position estimate, or the gravity based position estimate.

12. An iterative method according to claim 9, further comprising weighting the terrain based and the gravity based position estimate, optionally depending on an estimated accuracy associated with the terrain based position estimate and/or gravity based position estimate.

13. A computer-readable medium comprising instructions that are executable by a processor to perform the iterative method of claim 9.

* * * * *